United States Patent
Goodman et al.

(10) Patent No.: US 9,384,146 B2
(45) Date of Patent: *Jul. 5, 2016

(54) DYNAMIC RESERVATIONS IN A UNIFIED REQUEST QUEUE

(71) Applicant: INTERNATIONAL BUSINESS MACHINES CORPORATION, Armonk, NY (US)

(72) Inventors: Benjiman L. Goodman, Cedar Park, TX (US); Harrison M. McCreary, Austin, TX (US); Eric E. Retter, Austin, TX (US); Steven L. Roberts, Cedar Park, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/036,508

(22) Filed: Sep. 25, 2013

(65) Prior Publication Data

US 2014/0310487 A1    Oct. 16, 2014

Related U.S. Application Data

(63) Continuation of application No. 13/862,057, filed on Apr. 12, 2013.

(51) Int. Cl.
*G06F 12/12* (2006.01)
*G06F 13/40* (2006.01)
*G06F 12/08* (2016.01)

(52) U.S. Cl.
CPC ............ *G06F 12/121* (2013.01); *G06F 12/123* (2013.01); *G06F 13/4059* (2013.01); *G06F 12/0831* (2013.01); *G06F 2213/0038* (2013.01)

(58) Field of Classification Search
None
See application file for complete search history.

(56) References Cited

U.S. PATENT DOCUMENTS

| | | | | |
|---|---|---|---|---|
| 5,991,819 | A * | 11/1999 | Young | G06F 13/1663 709/203 |
| 6,038,645 | A * | 3/2000 | Nanda et al. | 711/141 |
| 6,738,371 | B1 * | 5/2004 | Ayres | 370/352 |
| 7,369,500 | B1 * | 5/2008 | Gallagher et al. | 370/235 |
| 7,444,491 | B1 * | 10/2008 | Steinbusch | 711/170 |
| 8,775,549 | B1 * | 7/2014 | Taylor | 709/217 |
| 2003/0163660 | A1 * | 8/2003 | Lam | G06F 5/065 711/170 |
| 2003/0223442 | A1 * | 12/2003 | Huang et al. | 370/412 |
| 2004/0111541 | A1 * | 6/2004 | Meyer et al. | 710/52 |
| 2004/0111565 | A1 * | 6/2004 | Arimilli | G06F 12/0822 711/144 |

(Continued)

OTHER PUBLICATIONS

Akesson et al., "Predator: A Predictable SDRAM Memory Controller", AMC, Sep. 30-Oct. 3, 2007.

(Continued)

*Primary Examiner* — Yaima Rigol
(74) *Attorney, Agent, or Firm* — Brain F. Russell; Steven Bennett

(57) ABSTRACT

A unified request queue includes multiple entries for servicing multiple types of requests. Each of the entries of the unified request queue is generally allocable to requests of any of the multiple request types. A number of entries in the unified request queue is reserved for a first request type among the multiple types of requests. The number of entries reserved for the first request type is dynamically varied based on a number of requests of the first request type rejected by the unified request queue due to allocation of entries in the unified request queue to other requests.

8 Claims, 7 Drawing Sheets

(56) References Cited

U.S. PATENT DOCUMENTS

| | | | |
|---|---|---|---|
| 2006/0045008 A1* | 3/2006 | Sun et al. ............... | 370/229 |
| 2008/0063004 A1* | 3/2008 | Himberger et al. ........ | 370/413 |
| 2011/0119679 A1* | 5/2011 | Muppirala et al. ......... | 718/105 |
| 2011/0320728 A1* | 12/2011 | Dunn Berger et al. ...... | 711/130 |
| 2013/0067172 A1* | 3/2013 | Rizzo ................ | G06F 13/12 711/148 |

OTHER PUBLICATIONS

Ganesh, "Understanding and Optimizing High-Speed Serial Memory System Protocols", Thesis submitted to the Faculty of the Graduate School of the University of Maryland, 2007.

Hq Le et al., "IBM POWER6 microarchitecture", IBM J. Res. & Dev. vol. 51 No. 6, Nov. 2007.

Tendler et al., "POWER7 Processors: The Beat Goes On", Date of submitted document: Mar. 22, 2013.

Loh, "3D-Stacked Memory Architectures for Multi-Core Processors", In the proceedings of the 35th ACM/IEEE International Conference on Computer Architecture, Jun. 2008.

Goodman et al., "Dynamic Reservations in a Unified Request Queue", U.S. Appl. No. 13/862,057 Non-Final Office Action dated Aug. 10, 2015.

Goodman et al., "Dynamic Reservations in a Unified Request Queue", U.S. Appl. No. 13/862,057 Final Office Action dated Jan. 14, 2016.

Goodman et al., "Dynamic Reservations in a Unified Request Queue", U.S. Appl. No. 13/862,057 Notice of Allowance dated Mar. 9, 2016.

* cited by examiner

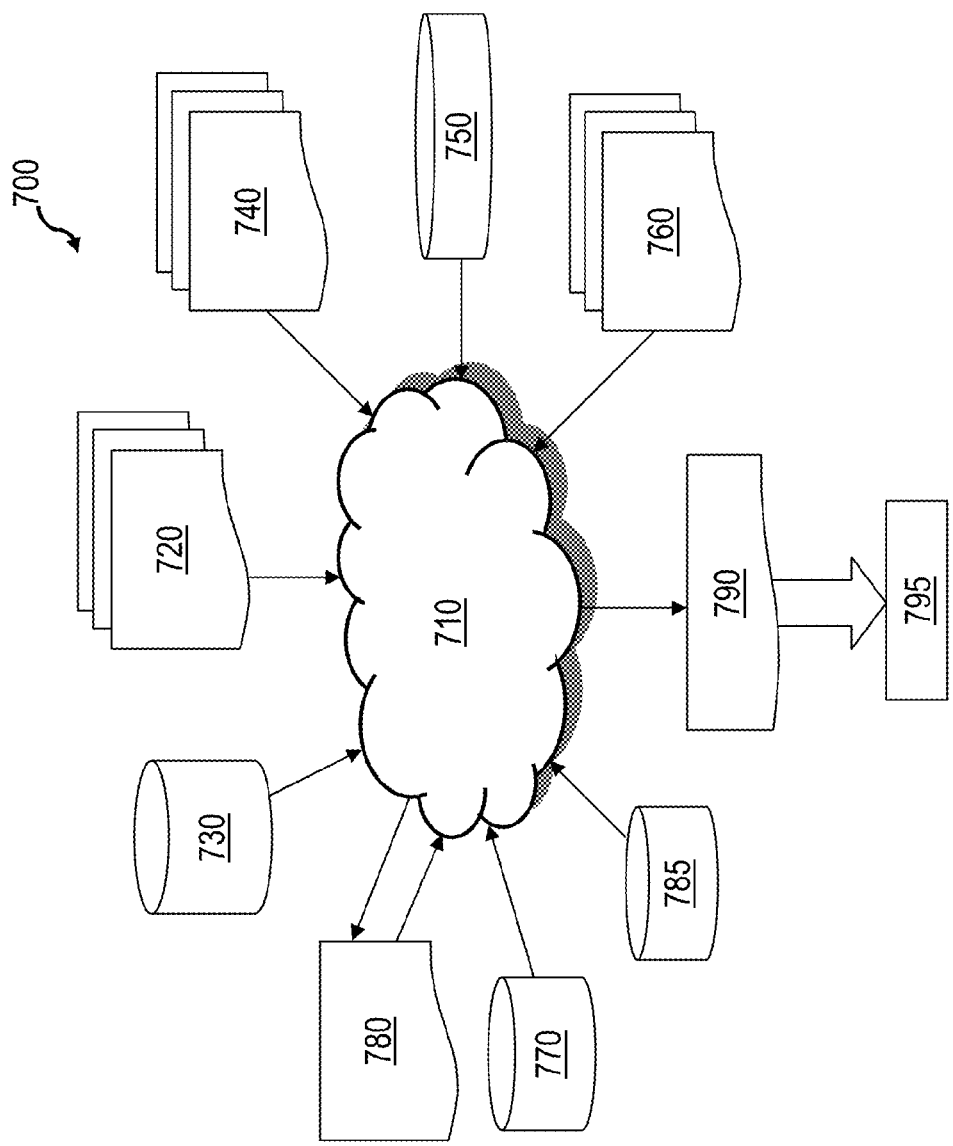

DYNAMIC RESERVATIONS IN A UNIFIED REQUEST QUEUE

PRIORITY CLAIM

This application is a continuation of U.S. patent application Ser. No. 13/862,057, entitled "DYNAMIC RESERVATIONS IN A UNIFIED REQUEST QUEUE," filed on Apr. 12, 2013, the disclosure of which is incorporated herein by reference in its entirety for all purposes.

BACKGROUND OF THE INVENTION

The present invention relates in general to data processing, and in particular, to ensuring fairness among classes of requests in a unified request queue by implementing dynamic reservations for queue entries.

A conventional multiprocessor data processing system includes multiple processor cores supported by a volatile memory hierarchy, including, at its upper levels, one or more cache memory hierarchies and, at its lower level, one or more system memories. Each system memory is conventionally controlled and accessed by an associated memory controller that participates in coherent communication with the cache hierarchies via a system bus.

Conventional memory controller designs employ either a unified request queue that buffers read and write requests interspersed in the entries of the same queue structure or bifurcated request queues that buffer read and write requests in separate queue structures. A conventional unified request queue allocates queue entries to memory access requests on a first-come, first served (FCFS) basis, thus enabling up to all queue entries to be allocated only to read requests or only to write requests. As compared to a bifurcated design of equivalent depth, this flexibility in entry allocation provides enhanced capacity for requests of a given type, which enables the memory controller to handle periods of read or write bursts with fewer or no retries. One disadvantage of FCFS entry allocation is that read or write requests may not, over time, receive numerically fair usage of the entries of the unified request queue. The problem of fairness has been addressed in some prior designs by statically reserving a predetermined number of entries in the unified request queue for read requests and statically reserving a predetermined number of entries in the unified request queue for write requests; however, static reservation of entries negates the desirable flexibility of unified request queues.

The issues of fairness regarding the allocation of entries of a unified request queue is not limited to simple numerical parity in the number of entries allocation to the various types of memory access requests. An additional fairness issue arises from the fact that the lifetimes of read and write requests in the entries of the unified request queue can differ substantially, as can the data bandwidth consumed by the different types of requests. These additional issues can lead to further imbalance in utilization of the unified request queue.

BRIEF SUMMARY

In at least one embodiment, a unified request queue includes multiple entries for servicing multiple types of requests. Each of the entries of the unified request queue is generally allocable to requests of any of the multiple request types. A number of entries in the unified request queue is reserved for a first request type among the multiple types of requests. The number of entries reserved for the first request type is dynamically varied based on a number of requests of the first request type rejected by the unified request queue due to allocation of entries in the unified request queue to other requests.

BRIEF DESCRIPTION OF THE SEVERAL VIEWS OF THE DRAWINGS

FIG. 7 is a data flow diagram of an exemplary design process.

DETAILED DESCRIPTION

Figure 1:
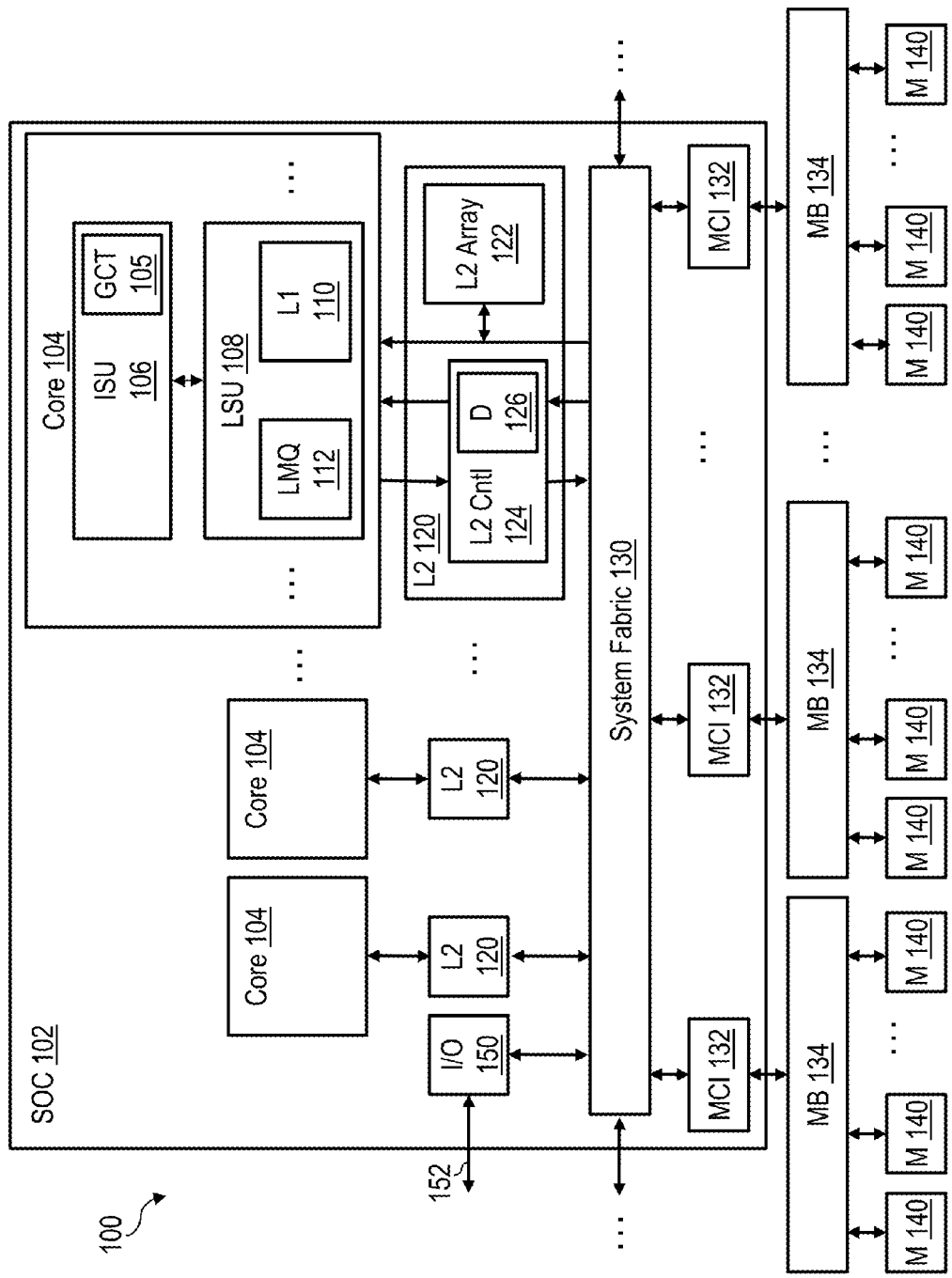
FIG. 1 is a high level block diagram of an exemplary data processing system in accordance with one embodiment.

With reference now to the figures and with particular reference to FIG. 1, there is illustrated a high level block diagram of an exemplary data processing system 100 that is one of the numerous possible embodiments of a data processing system in accordance with the principles and techniques disclosed herein. Data processing system 100 may be implemented, for example, with one of the IBM Power servers, a product line of International Business Machines Corporation of Armonk, N.Y.

In the depicted embodiment, data processing system 100 includes at least one system-on-a-chip (SOC) 102, and as indicated by elliptical notation, possibly numerous SOCs 102 coupled by system fabric 130 integrated within the SOCs 102. Each SOC 102 is preferably realized as a single integrated circuit chip having a substrate in which semiconductor circuitry is fabricated as is known in the art. Each SOC 102 includes multiple processor cores 104 that independently process instructions and data. In some embodiments, processor cores 104 further support simultaneous multithreading in which multiple independent threads are concurrently executed. Each processor core 104 includes an instruction sequencing unit (ISU) 106 for fetching instructions, ordering the instructions for execution, and completing the instructions by committing the results of execution to the architected state of the processor core 104. ISU 106 completes instructions by reference to a global completion table (GCT) 105.

Each processor core 104 further includes one or more execution units for executing instructions such as, for example, fixed and floating point arithmetic instructions, logical instructions, and load-type and store-type instructions that respectively request read and write access to a target memory block in the coherent address space of data processing system 100. In particular, the execution units include a load-store unit (LSU) 108 that executes the load-type and store-type instructions to compute target addresses of read and write memory access operations. LSU 108 includes a store-through level one (L1) cache 110 from which read memory access operations can be satisfied, as well as a load miss queue (LMQ) 112 that tracks read memory access operations that miss in L1 cache 110.

The operation of each processor core 104 is supported by a multi-level hierarchical memory subsystem having at its lowest level one or more shared system memories 140 (e.g., bulk DRAM) generally accessible by any of processor cores 104 in any of the SOCs 102 in data processing system 100, and at its upper levels, one or more levels of cache memory. As depicted, SOC 102 includes one or more (and preferably multiple) memory channel interfaces (MCIs) 132, each of which supports read and write accesses to an associated collection of system memories 140 in response to memory access operations received via system fabric 130 from processor cores 104 in the same SOC 102 or other SOCs 102. In the depicted embodiment, each MCI 132 is coupled to its associated collection of system memories 140 via an external memory buffer (MB) 134. Each pair of an MCI 134 and MB 134 thus forms a distributed memory controller.

In the illustrative embodiment, the cache memory hierarchy supporting each processor core 104 of SOC 102 includes the store-through level one (L1) cache 110 noted above and a private store-in level two (L2) cache 120. As shown, L2 cache 120 includes an L2 array 122 and an L2 controller 124, which includes control logic and a directory 126 of contents of L2 array 122. L2 controller 124 initiates operations on system fabric 130 and/or accesses L2 array 122 in response to memory access (and other) requests received from the associated processor core 104. In an embodiment in which a snoop-based coherency protocol is implemented (as will be hereafter assumed unless otherwise noted), L2 controller 124 additionally detects operations on system fabric 130, provides appropriate coherence responses, and performs any accesses to L2 array 122 required by the snooped operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

SOC 102 further includes one or more integrated I/O (input/output) interfaces 150 supporting I/O communication via one or more external communication links 152 with one or more I/O controllers, such as PCI host bridges (PHBs), Infini-Band controllers, FibreChannel controllers, etc. Those skilled in the art will appreciate that data processing system 100 can include many additional or alternative components, which are not necessary for an understanding of the invention set forth herein are accordingly not illustrated in FIG. 1 or discussed further herein.

Figure 2:
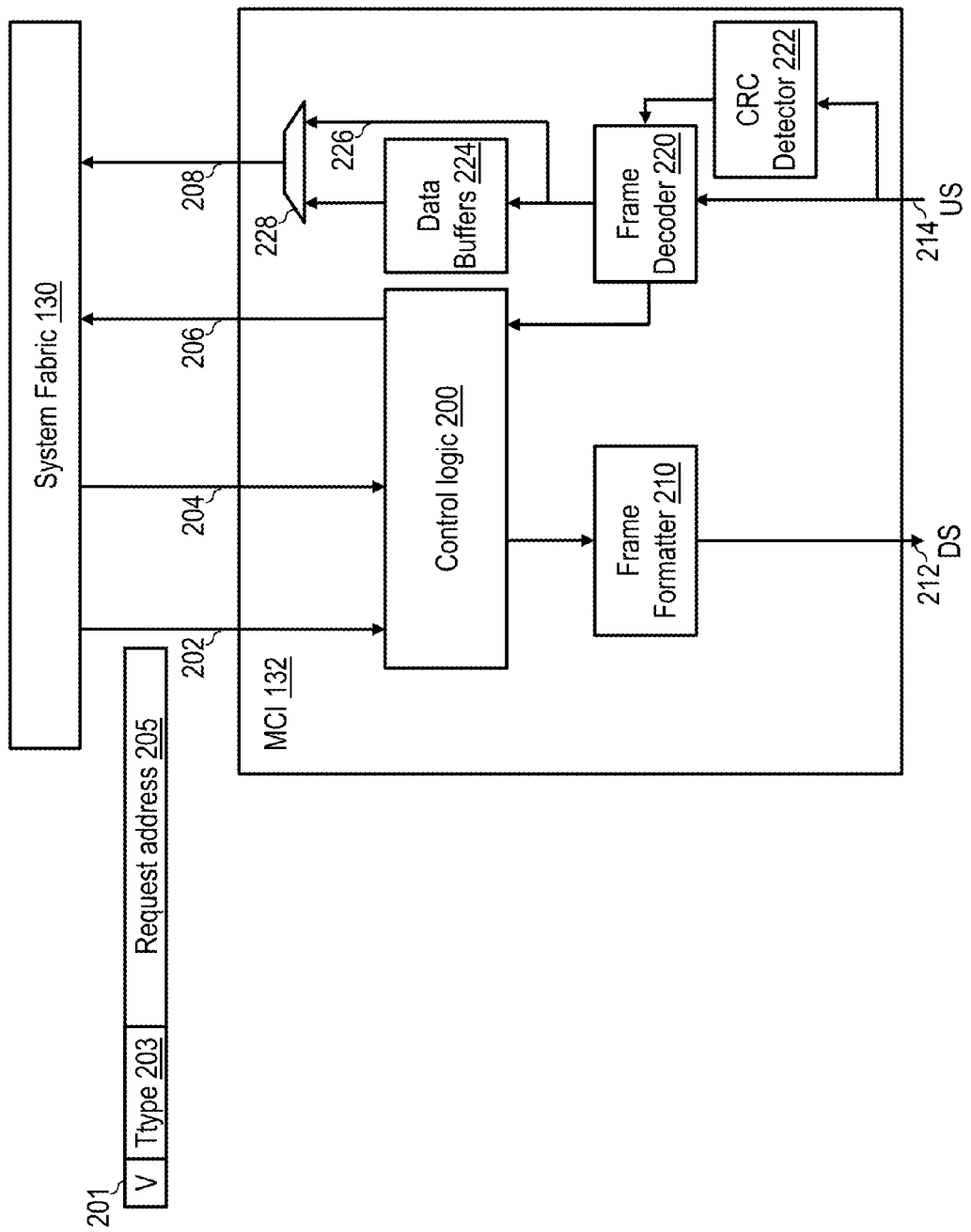
FIG. 2 is a more detailed view of a memory channel interface (MCI) of FIG. 1 in accordance with one embodiment.

Referring now to FIG. 2, there is depicted a more detailed view of one of the memory channel interfaces (MCIs) 132 of FIG. 1 in accordance with one embodiment. In the depicted embodiment, MCI 132 is coupled to system fabric 130 via downstream (i.e., toward system memories 140) request and data interfaces 202 and 204 and upstream (i.e., toward system fabric 130) control and data interfaces 206 and 208. Request interface 202 receives from system fabric 130 read and write memory access requests of various operations. As indicated in FIG. 2, each memory access request received on request interface 202 includes, for example, a valid field 201 indicating whether the memory access request of the operation is valid, a transaction type (TType) field 203 indicating the transaction type of the memory access request (e.g., read, write and/or possibly additional types), and a request address field 205 specifying the address of the target memory block of the memory access request. Data interface 204 receives from system fabric 130 data to be written to the associated collection of system memories 140 by write memory access requests. Control and data interfaces 206 and 208 are utilized to return requested data to various request sources (e.g., processor cores 104 and I/O controllers 150) via system fabric 130.

MCI 132 includes control logic 200 that controls access to the associated collection of system memories 140 in response to memory access operations received from system fabric 130. In response to receipt of the request of a memory access operation on system fabric 130, control logic 200 determines by reference to valid field 201 and request address field 205 of the memory access request whether or not the memory access request is valid and specifies a target address within the collection of system memories 140 controlled by that MCI 132. If not, the memory access request is dropped. If, however, control logic 200 validates and qualifies the memory access request as directed to one of its associated system memories 140 and an entry is available in its unified request queue, control logic 200 buffers the memory access request in its unified request queue (as discussed in greater detail with reference to FIGS. 4-6) and subsequently causes the memory access request to be serviced by transmitting the memory access request and associated write data, if any, from the unified request queue to frame formatter 210.

Frame formatter 210, in response to receipt of the memory access request and write data, if any, formats the memory access request and write data, if any, into one or more frames and transmits those frame(s) to a memory buffer 134 coupled to SOC 102 via a downstream memory buffer interface 212. As will be appreciated, the frame format may vary widely between implementations based on a variety of factors including the pin counts available to implement downstream memory buffer interface 212 and the corresponding upstream memory buffer interface 214.

As further shown in FIG. 2, MCI 132 additionally includes a frame decoder 220 that receives frames from a memory buffer 134 coupled to SOC 102 via upstream memory buffer interface 214. Frame decoder 220 decodes such frames to extract data being transmitted upstream and associated control information. Cyclic Redundancy Check (CRC) detector 222 additionally performs a CRC (e.g., parity check or other CRC processing) on the frame in parallel with the processing performed by frame decoder 220 to verify that the frame has not been corrupted in transmission from memory buffer 134. In response to CRC detector 222 signaling that the frame has not been corrupted, frame decoder 220 forwards control information extracted from the frame, such as a data tag identifying the operation to which the data belongs and a data error indicator indicating whether or not the data contains an error. Control logic 200 receives the control information extracted by frame decoder 220 and forwards that control information to system fabric 130 via upstream control interface 206. MCI 132 additionally includes two data paths for upstream data extracted by frame decoder 220: (1) a fast path 226 selected for critical words of target memory blocks and other high priority data transfers, and (2) a buffered data path including data buffers 224 for buffering low priority data. A multiplexer 228 applies a selected arbitration policy to select data from one of the two data paths for transmission on system fabric 130, but to minimize access latency, preferentially selects data from fast path 226 without starving out the buffered data path.

Figure 3:
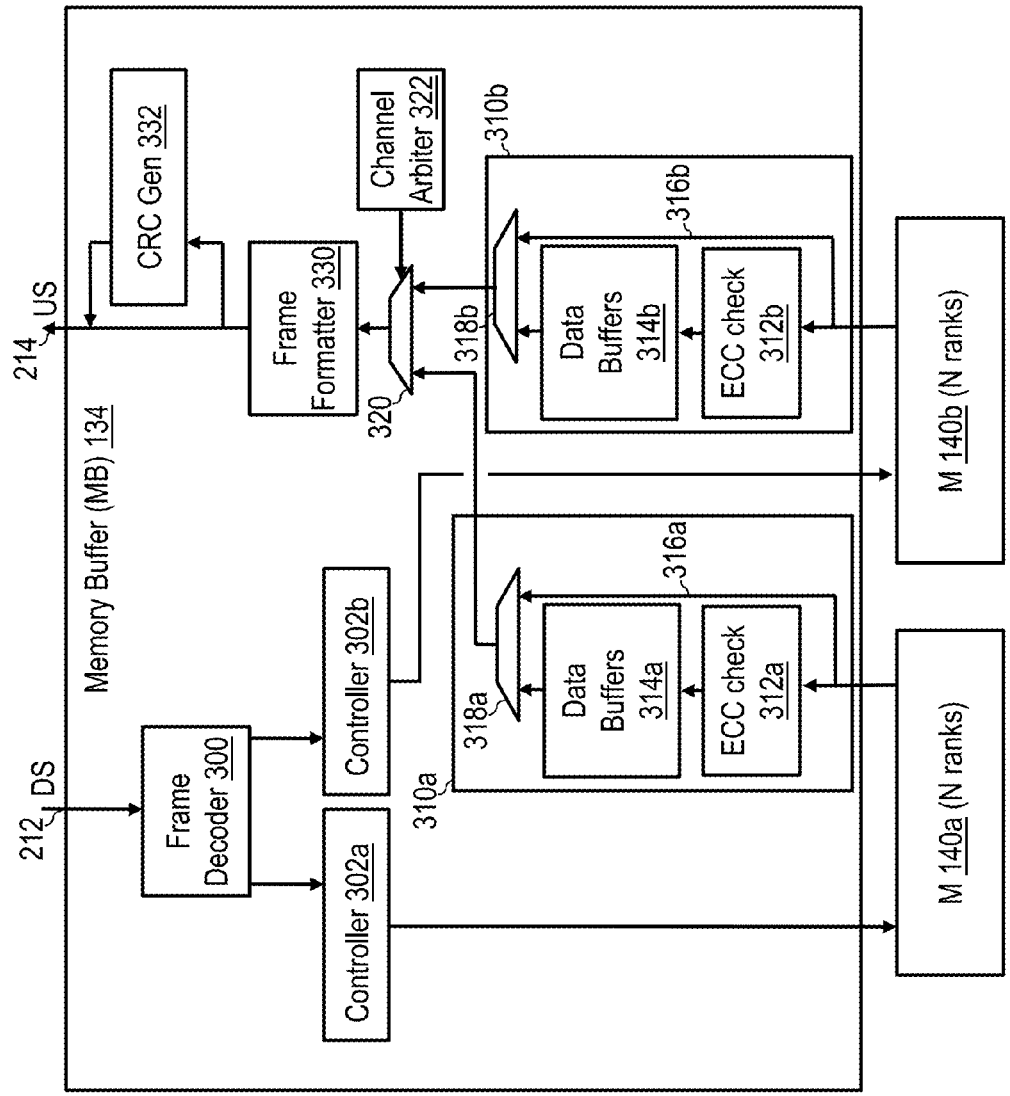
FIG. 3 is a more detailed view of a memory buffer (MB) of FIG. 1 in accordance with one embodiment.

With reference now to FIG. 3, there is illustrated a more detailed view of a memory buffer 134 of FIG. 1 in accordance with one embodiment. In the illustrated embodiment, memory buffer 134 includes a frame decoder 300 that receives frames from MCI 132 via downstream memory buffer interface 212. Frame decoder 300 decodes the frames and determines to which of multiple attached system memories 140 each memory access request is directed. Thus, in the depicted example in which the attached system memories 140 include at least system memories 140a and 140b, frame decoder 300 determines whether memory access requests specify a target address assigned to system memory 140a or to system memory 140b, and accordingly forwards the memory access requests to controller 302a or controller 302b for servicing. Controllers 302a and 302b service memory access request received from controllers 302a, 302b by directing appropriate read or write accesses to the associated one of system memories 140a and 140b.

Memory buffer 134 additionally includes a respective read channel 310a, 310b for each attached system memory 140a, 140b. Each of read channels 310a, 310b includes an ECC check circuit 312a, 312b that performs error detection and error correction processing, preferably on all data read from the associated one of system memories 140a, 140b. Each of read channels 310a, 310b further includes a fast path 316a, 316b by which selected data granules read from the associated one of system memories 140a, 140b are also permitted to bypass ECC check circuit 312a, 312b in order to decrease memory access latency. For example, in one embodiment in which a memory block is communicated from system memories 140 to processor cores 104 in four granules, only the first three of the four data granules are permitted to speculatively bypass the ECC check circuit 312, while all four granules are also always routed through ECC check circuit 312 so that a data error indicator indicating whether or not the memory block contains an error can conveniently be forwarded upstream with the last granule. The first three of the four data granules that are also routed through the ECC check circuit 312 are then discarded since they were already forwarded via the fast path 316a, 316b. To permit data transmitted via fast path 316a, 316b to be forwarded with minimal latency, each of read channels 310a, 310b additionally includes data buffers 314a, 314b for buffering lower priority data output by ECC check circuit 312a, 312b as needed. A multiplexer 318a, 318b within each read channel 310a, 310b applies a selected arbitration policy to select data from data buffers 314a, 314b and fast path 316a, 316b for forwarding. The arbitration policy preferentially selects data from fast path 316a, 316b without starving out the buffered data path.

The read channels 310a, 310b of memory buffer 134 are all coupled to inputs of a multiplexer 320 controlled by a channel arbiter 322. Channel arbiter 322 applies a desired arbitration policy (e.g., modified round robin) to generally promote fairness between read channels 310a, 310b, while giving preference to data transfers of fast path data. Each data transfer selected by channel arbiter 322 is received by frame formatter 330, which formats the data transfer into one or more frames and transmits those frame(s) to the MCI 132 coupled to memory buffer 134 via an upstream memory buffer interface 214 after a check value is appended by CRC generator 332.

Figure 4:
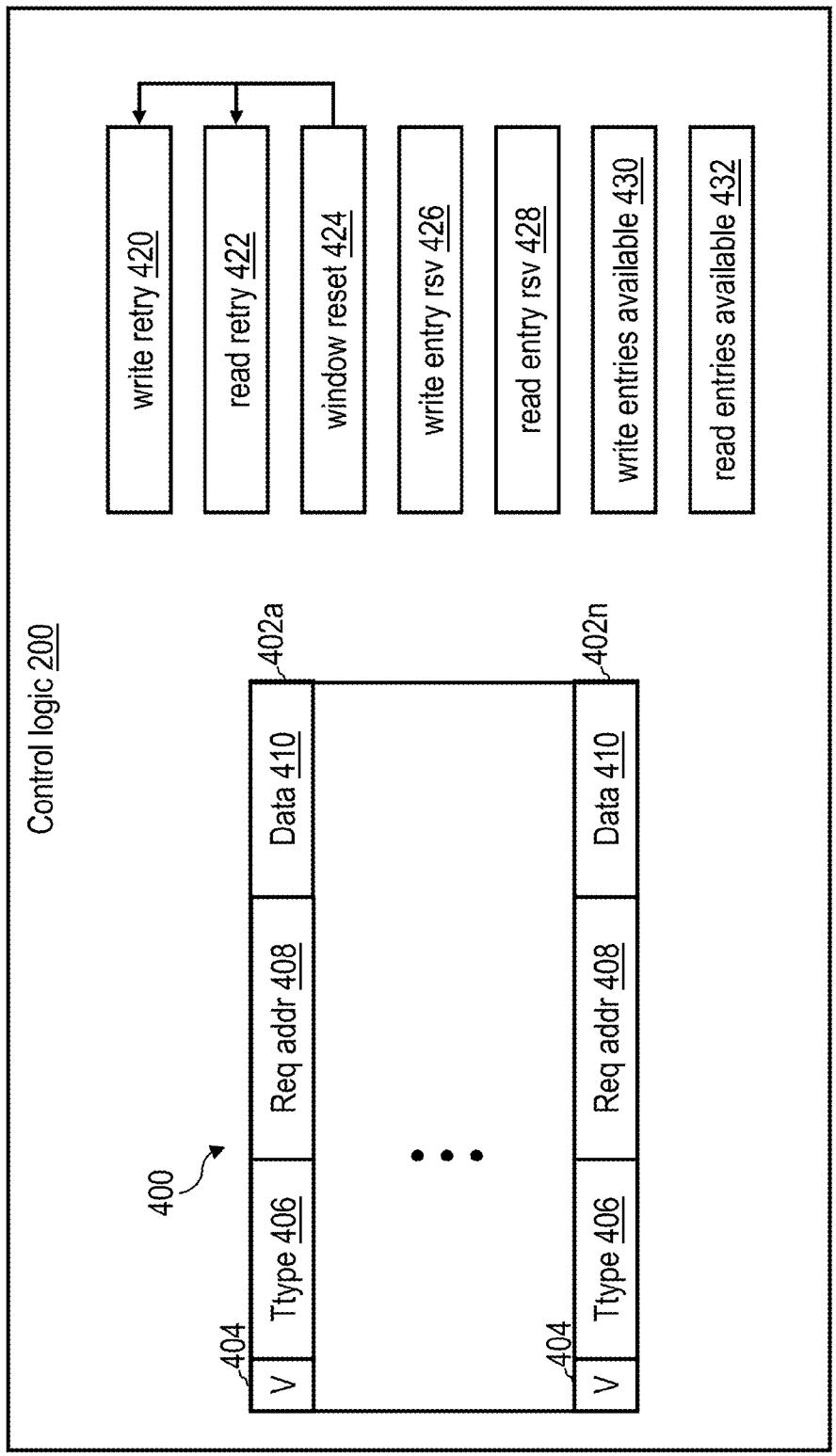
FIG. 4 is a more detailed view of the control logic of the MCI of FIG. 2 in accordance with one embodiment.

Referring now to FIG. 4, there is depicted a more detailed view of the control logic 200 of MCI 132 of FIG. 2 in accordance with one embodiment. As shown, control logic 200 includes a unified request queue 400 having a plurality of entries 402a-402n for buffering read or write memory access requests targeting an associated system memory 140. In the depicted example, each entry 402, which is generally allocable to memory access requests of any type, includes a valid field 404 indicating the validity of the entry 402, a Ttype field 406 indicating the transaction type of the memory access request (e.g., a read or a write), and a request address field 408 specifying the address of the target memory block of the memory access request, and a data field 410 that, for write memory access requests, buffers the data to be written to system memory 140.

To manage the reservation and allocation of entries 402 in unified request queue 400, control logic 200 includes an associated set of counters 420-432. Specifically, write retry counter 420 counts a number of write memory access requests snooped by MCI 132 that are given a retry response for lack of an available queue entry 402 in unified request queue 400. Similarly, read retry counter 422 counts a number of read memory access requests snooped by MCI 132 that are given a retry response for lack of an available queue entry 402 in unified request queue 400. Write retry counter 420 and read retry counter 422 are periodically reset in response to window reset counter 424 expiring (e.g., overflowing), for example, at a frequency of once every 1,000 to 5,000 clock cycles.

The counters implemented within control logic 200 further include a write entry reservation counter 426 and read entry reservation counter 428 that respectively indicate how many entries of unified request queue 400 are reserved for write requests and read requests. In a preferred embodiment, control logic 200 initializes both of write entry reservation counter 426 and read entry reservation counter 428 to 0, indicating that any free entry 402 in memory access queue 400 is initially available for allocation to any type of memory access request. As described below, control logic 200 periodically and dynamically increases and/or decreases the number of entries 402 reserved for read and/or write requests based on contention for entries 402. In a preferred embodiment, write entry reservation counter 426 and read entry reservation counter 428 are implemented as saturating counters that each saturate at a respective predetermined minimum (e.g., 0) and a predetermined maximum, which is preferably less than the total number of entries 402 in unified request queue 400.

Control logic 200 further includes a write entries available counter 430 and read entries available counter 432 that respectively indicate the number of entries 402 in unified request queue 400 available for allocation to write requests and read requests. The count maintained by control logic 200 in write entries available counter 430 is equal to the number of unused entries 402 less the number of unused entries 402 reserved for read requests (based on the current value of read entry reservation counter 428). Similarly, the count maintained by control logic 200 in read entries available counter 432 is equal to the number of unused entries 402 less the current number of unused entries 402 reserved for write requests (based on the value of write entry reservation counter 426). Thus, write entries available counter 430 and read entries available counter 432 are decremented on allocation of an entry 402 of unified request queue 400, incremented on deallocation of an entry 402 of unified request queue (i.e., when the memory access request is forwarded to memory buffer 134 for servicing), and either decremented or incremented as the number of reserved entries for the other request type is dynamically updated.

Figure 5:
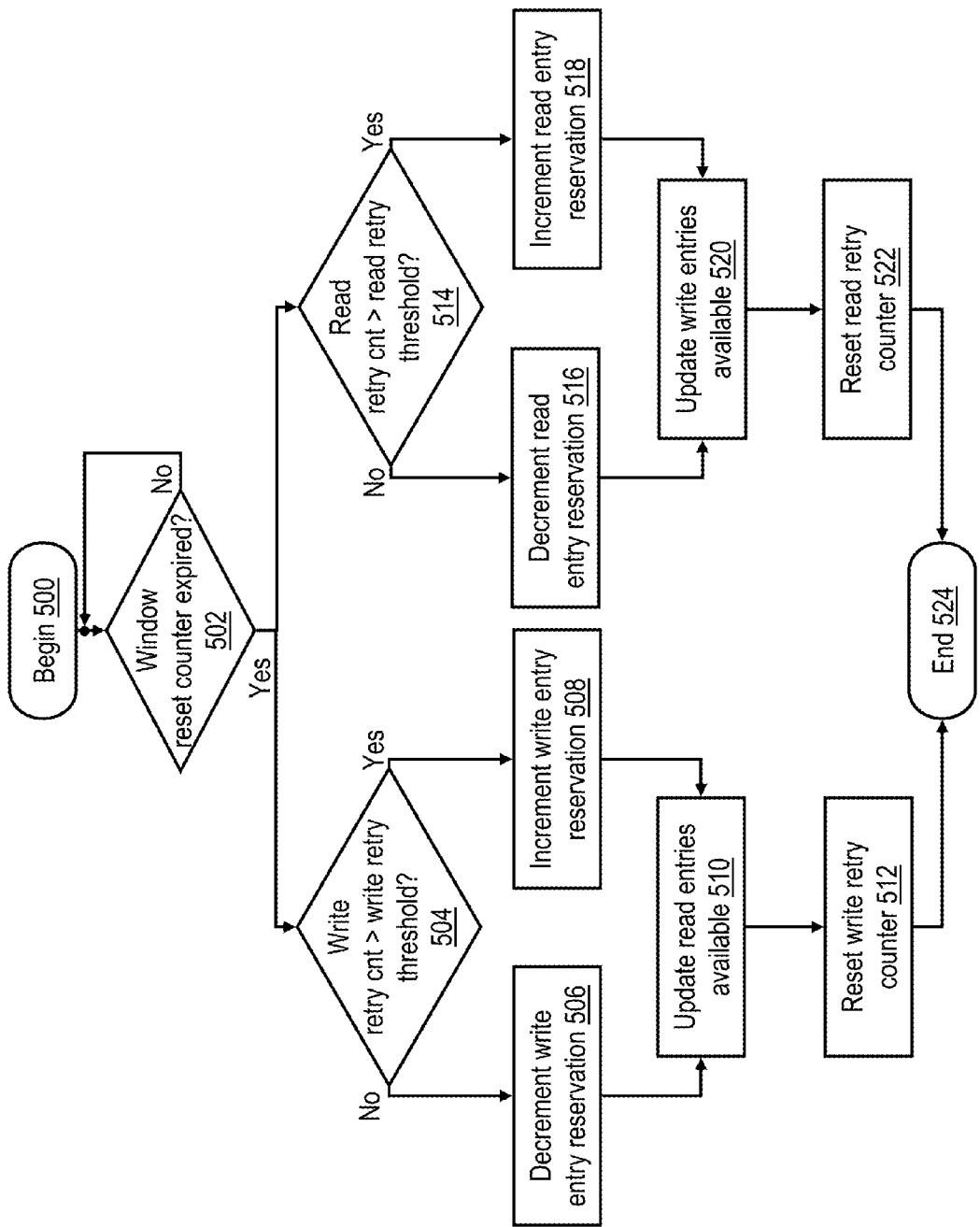
FIG. 5 is a high level logical flowchart of an exemplary method of dynamically determining reservations in a unified request queue in accordance with one embodiment.

With reference now to FIG. 5, there is illustrated a high level logical flowchart of an exemplary method of dynamically determining reservations in a unified request queue in accordance with one embodiment. The illustrated method may be implemented, for example, by control logic 200 of MCI 132 to determine the reservation of entries 402 for write requests and read requests in unified request queue 400, as indicated by write entry reservation counter 426 and read entry reservation counter 428, respectively.

The process of FIG. 5 begins at block 500 and then proceeds to block 502, which illustrates control logic 200 of MCI 132 awaiting expiration (e.g., overflow) of window reset counter 424. In response to window reset counter 424 expiring, the process proceeds to block blocks 504 and 514. At block 504, control logic 200 determines whether or not the write retry count of write retry counter 420 satisfies (e.g., is greater than) a write retry threshold. In response to a determination that the write retry threshold is not satisfied, control logic 200 decrements write entry reservation counter 426 (block 506). Alternatively, in response to a determination that the write retry threshold is satisfied, control logic 200 increments write entry reservation counter 426 (block 508). As noted above, in a preferred embodiment, write entry reservation counter 426 is implemented as saturating counter, meaning that the value saturates at both a predetermined minimum (e.g., 0) and a predetermined maximum that is preferably less than the total number of entries 402 in unified request queue 400. Following block 506 or block 508, control logic 200 updates the count of available read entries indicated in read entries available counter 432, as shown at block 510. Control logic 200 additionally resets write retry counter 420, as shown at block 512.

Referring now to block 514, control logic 200 determines whether or not the read retry count of read retry counter 422 satisfies (e.g., is greater than) a read retry threshold. In response to a determination that the read retry threshold is not satisfied, control logic 200 decrements read entry reservation counter 428 (block 516). Alternatively, in response to a determination that the read retry threshold is satisfied, control logic 200 increments read entry reservation counter 428 (block 518). As noted above, in a preferred embodiment, read entry reservation counter 428 is implemented as saturating counter, meaning that the value saturates at both a predetermined minimum (e.g., 0) and a predetermined maximum that is preferably less than the total number of entries 402 in unified request queue 400. Following block 516 or block 518, control logic 200 updates the count of available write entries indicated in write entries available counter 430, as shown at block 520. Control logic 200 additionally resets read retry counter 422, as shown at block 522. The process of FIG. 5 proceeds from blocks 512 and 522 to block 524 and terminates.

Figure 6:
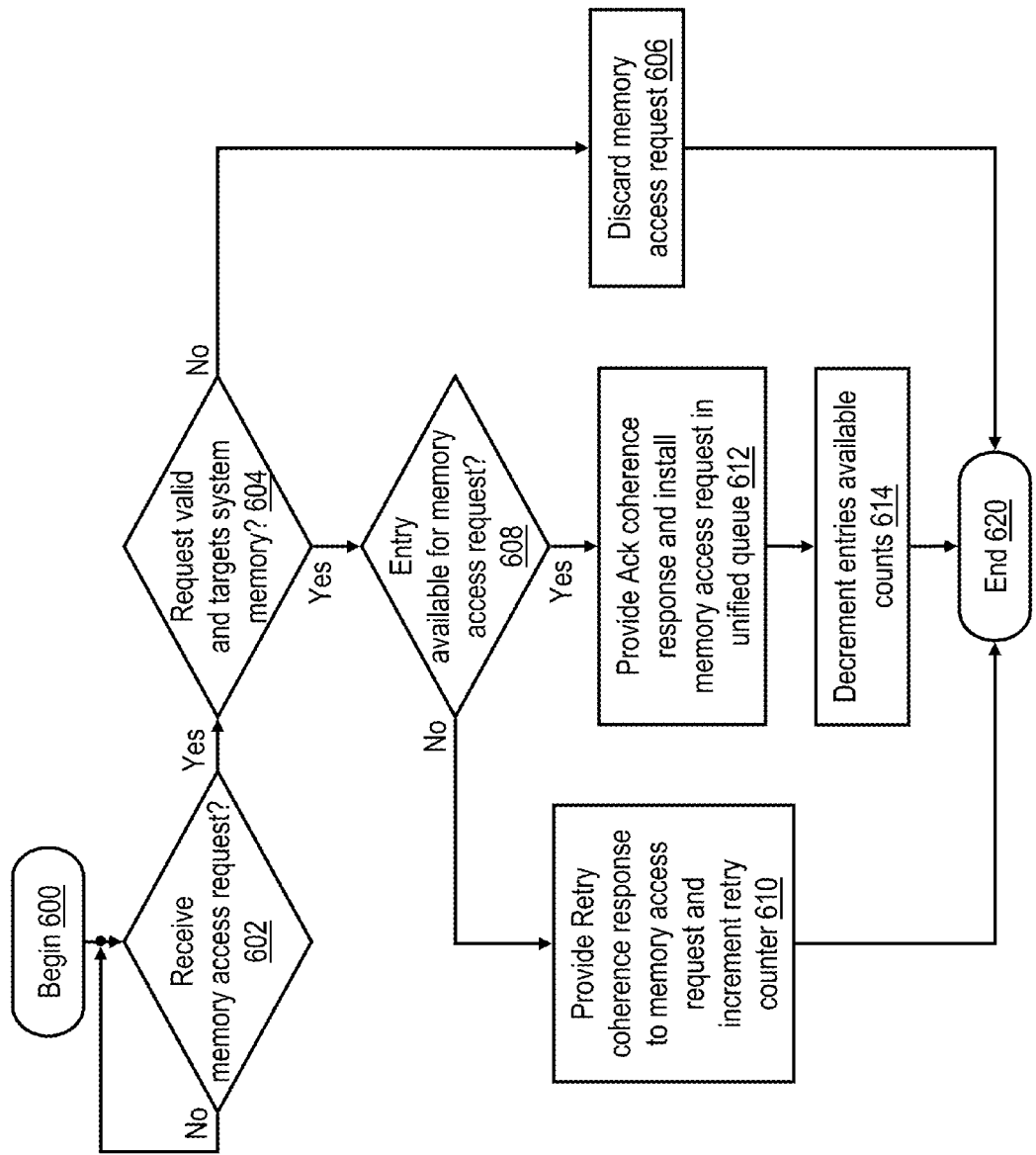
FIG. 6 is a high level logical flowchart of an exemplary method of allocating entries in a unified request queue in accordance with one embodiment.

Referring now to FIG. 6, there is depicted a high level logical flowchart of an exemplary method of allocating entries in a unified request queue in accordance with one embodiment. The process of FIG. 6 may be performed, for example, by control logic 200 of MCI 132 to allocate entries 402 in unified request queue 400 to snooped memory access requests.

The process of FIG. 6 begins at block 600 and the proceeds to block 602, which illustrates control logic 200 awaiting receipt of a memory access request via system fabric 130. In response to snooping a memory access request via system fabric 130, control logic 200 determines at block 604 whether or not the snooped memory access request is valid and the request address 205 specified by the snooped memory access request targets a location in the system memories 140 controlled by the distributed memory controller including MCI 132. Control logic 200 can determine whether the memory access request is valid, for example, by reference to valid bit 204, and can determine whether request address 205 targets an associated system memory 140, for example, by reference to an unillustrated base address register facility or utilizing a hashing function. In response to determining at block 604 that the snooped memory access request is invalid or the request address 205 of the memory access request does not target a location in the associated system memories 140, control logic 200 discards the memory access request, as shown at block 606. The process of FIG. 6 then ends at block 620.

Returning to block 604, in response to a determination that the snooped memory request is valid and that the request address 205 of the snooped memory access request targets a location in the associated system memories 140, the process passes block 608. Block 608 depicts control logic 200 determining whether or not an entry 402 in unified request queue 400 is available for allocation to the transaction type of the snooped memory access request, for example, by reference to the relevant one of write entries available counter 430 and read entries available counter 432. In response to control logic 200 determining at block 608 that no entry 402 in unified request queue 400 is available for allocation to the snooped memory access request, control logic 200 increments the relevant one of write retry counter 420 and read retry counter 422 and provides a Retry coherence response that invites the requestor that issued the memory access request to try the memory access request at a later time (block 610). It should be appreciated that this Retry coherence response is provided even if one or more unused entries 402 are available in unified request queue 400 in cases in which the one or more unused entries 402 are reserved for allocation to requests of another request type. In a typical scenario, if the requestor does retry the memory access request in response to the Retry coherence response, an entry 402 will likely be available when the memory access request is again issued due to one or more of the memory access requests buffered in unified request queue 400 being forwarded to memory buffer 134 and removed from unified request queue 400. Following block 610, the process of FIG. 6 terminates at block 620.

Returning to block 608, in response to control logic 200 determining that an entry 402 in unified request queue 400 is available for allocation to the memory access request, control logic 200 provides an Ack coherence response on system fabric 130, signaling its acceptance of the memory access request for servicing, as shown at block 612. In addition, control logic 200 installs the memory access request in an available entry 402 of unified request queue 400. At block 614, control logic 200 also reflects the allocation of the entry 402 to the memory access request by decrementing the number of available queue entries indicated by each of write entries available counter 430 and read entries available counter 432 (assuming the count value is not already 0). Thereafter, the process of FIG. 6 ends at block 620.

With reference now to FIG. 7, there is illustrated a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown above. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures disclosed above to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention disclosed herein. In one embodiment, design structure 790 may comprise a compiled, executable HDL simulation model that functionally simulates the devices disclosed above.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above. Design structure 790 may then proceed to a stage 795 where, for example, design structure 790: proceeds to tape-out, is released to manufacturing, is released to a mask house, is sent to another design house, is sent back to the customer, etc.

As has been described, in at least one embodiment, a unified request queue includes multiple entries for servicing multiple types of requests. Each of the entries of the unified request queue is generally allocable to requests of any of the multiple request types. A number of entries in the unified request queue is reserved for a first request type among the multiple types of requests. The number of entries reserved for the first request type is dynamically varied based on a number of requests of the first request type rejected by the unified request queue due to allocation of entries in the unified request queue to other requests.

One benefit of the disclosed queue management technique is that no entries need be reserved for a particular type or class of requests absent the general unavailability of queue entries to receive requests of that type or class (as evidenced by a greater than threshold number of retries within a predetermined interval). If contention arises, the disclosed queue management technique compensates to ensure fairness by reserving sufficient queue entries to provide a baseline bandwidth for each type or class of request.

While various embodiments have been particularly shown as described with reference to a preferred embodiment, it will be understood by those skilled in the art that various changes in form and detail may be made therein without departing from the spirit and scope of the claims. For example, although an embodiment has been described in which two classes of requests are employed (e.g., read request and write requests), those skilled in the art will appreciate that the queue management technique disclosed herein is applicable to embodiments in which more than two classes or types of requests are employed. Further, although aspects have been described with respect to a computer system executing program code that directs the functions of the present invention, it should be understood that present invention may alternatively be implemented as a program product including a computer-readable storage device (e.g., volatile or non-volatile memory, optical or magnetic disk or other statutory manufacture) that stores program code that can be processed by a data processing system. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A method of data processing in a data processing system, the method comprising:
   servicing multiple types of requests via a unified request queue including a total of N entries, wherein N is a positive integer greater than one and any of the N entries is allocable to a request of any of multiple request types;
   reserving a number of entries in the unified request queue for a first request type among the multiple request types; and
   dynamically varying the number of entries reserved for the first request type based on a number of requests of the first request type rejected by the unified request queue due to allocation of entries in the unified request queue to other requests, wherein: the data processing system includes a memory controller including the unified request queue;
   servicing multiple types of requests includes servicing multiple types of memory access requests; and
   wherein the dynamically varying includes dynamically varying the number of entries reserved for the first request type based on a number of Retry coherence responses provided for requests of the first request type within a predetermined period.

2. The method of claim 1, and further comprising initializing the number of entries that are reserved for the first request type to zero.

3. The method of claim 1, wherein the dynamically varying includes incrementing a number of reserved entries only up to maximum that is less than N.

4. The method of claim 1, and further comprising:
   dynamically varying a number of entries reserved for a second request type among the multiple request types based on a number of requests of the second request type rejected by the unified request queue due to allocation of entries in the unified request queue to other requests.

5. The method of claim 1, and further comprising:
   rejecting a request of a second request type without allocating a free entry of the unified request queue in response to the free entry being included among the number of entries reserved for the first request type.

6. The method of claim 1, and further comprising:
   in responsive to a request:
      allocating a free entry of the N entries to the request in response to being able to allocate the free entry while preserving the number of entries then reserved for the first request type; and
      refraining from allocating any free entry to the request in response to not being able to allocate the free entry while preserving the number of entries then reserved for the first request type.

7. The method of claim 1, wherein the reserving includes:
   tracking, utilizing a plurality of counters, the number of entries reserved for the first request type and a number of free entries available for allocation to requests of the first request type.

8. The method of claim 1, and further comprising:
   tracking in a counter the number of requests of the first request type rejected by the unified request queue due to allocation of entries in the unified request queue to other requests.

* * * * *